United States Patent

[11] 3,589,168

| [72] | Inventors | Paul M. Hankison<br>McMurray;<br>Dale B. Sherman, Bridgeville, both of, Pa. |
|---|---|---|
| [21] | Appl. No. | 767,555 |
| [22] | Filed | Aug. 15, 1968 |
| [45] | Patented | June 29, 1971 |
| [73] | Assignee | Hankison Corporation<br>Canonsburg, Pa.<br>Continuation-in-part of Ser. No. 727,194, May 7, 1968, abandoned. |

[54] METHOD AND APPARATUS FOR DETERMINING THE DEW POINT OF GASSES
10 Claims, 9 Drawing Figs.

[52] U.S. Cl. ................................................ 73/17
[51] Int. Cl. ........................................ G01n 25/02
[50] Field of Search ........................................ 73/17; 62/125

[56] References Cited
UNITED STATES PATENTS

| 2,108,173 | 2/1938 | Martin et al. | 73/17 |
| 2,415,776 | 2/1947 | Walton | 73/17 |
| 2,588,355 | 3/1952 | Burr et al. | 73/17 |
| 2,593,313 | 4/1952 | Kamm et al. | 73/17 |
| 2,697,933 | 12/1954 | Donath | 73/17 |
| 3,027,750 | 4/1962 | Brandt et al. | 73/17 |

FOREIGN PATENTS

| 1,170,368 | 1/1959 | France | 73/17 |

*Primary Examiner*—James J. Gill
*Assistant Examiner*—Herbert Goldstein
*Attorney*—Browne, Schuyler & Beveridge ABSTRACT: A method of an apparatus for determining the dew point of air or other vapor-containing gas, by placing a container of liquid refrigerant under pressure in a sample of the gas and reducing the temperature of the container surface from a level above the dew point of the gas to a level where condensation commences on the surface by gradually reducing the pressure on the liquid refrigerant and permitting the refrigerant to boil to reduce its temperature, and determining the temperature of the surface when condensation commences by measuring the pressure on the refrigerant within the container.

3,589,168

PATENTED JUN 29 1971

INVENTOR
PAUL M. HANKISON
DALE B. SHERMAN

BY Browne, Schuyler & Beveridge

ATTORNEYS

INVENTOR
PAUL M. HANKISON
DALE B. SHERMAN

BY *Browne, Schuyler & Beveridge*

ATTORNEYS

INVENTORS
PAUL M. HANKISON
DALE B. SHERMAN

BY Browne, Schuyler & Beveridge

ATTORNEYS

METHOD AND APPARATUS FOR DETERMINING THE DEW POINT OF GASSES

This is a continuation-in-part of our copending application Ser. No. 727,194, filed May 7, 1968, now abandoned.

This invention relates to a method of and an apparatus for determining dew points, and more particularly to an improved method and apparatus for quickly and accurately determining dew points over a wide range of conditions.

The need for a quick and accurate determination of dew points, particularly in industrial applications, has vastLy increased in recent years. While numerous devices have been developed and are commercially available for measuring and detecting dew points, these devices have not been entirely satisfactory for various reasons. For example, they have generally been relatively expensive to manufacture, operate, and/or maintain, have required excessive time for an accurate dew point determination, and generally have required the attention of a skilled operator for their accurate and reliable use. Further, the available commercial devices have generally not been capable of determining the dew point of a gas in a pressurized system while the gas was at system pressure. Accordingly, it is a primary object of the present invention to provide an improved apparatus for the determination of dew points, which apparatus is relatively inexpensive both to manufacture and to operate, and which may be employed to determine the dew point of a gas very quickly and accurately, either at atmospheric or at elevated pressure.

Another object of the invention is to provide such an apparatus which may readily be employed to quickly and accurately make a series of dew point determinations, or readings, to check the accuracy of individual readings, or to provide an average reading.

Another object is to provide an average reading.

Another object is to provide such an apparatus for determining the dew point of gas in a pressurized system while the gas is at system pressure.

Another object is to provide an improved method of determining the dew point of a gas.

In the attainment of the foregoing and other objects, an important feature of the invention resides in placing a surface in contact witH the gas, and gradually reducing the temperature of the surface until condensation commences to form on the surface. The temperature of the surface is determined when condensation commences to form thereon, and this temperature is an accurate determination of the dew point of the gas.

The operation of the apparatus, and the method of this invention, employ the well-known physical principle that liquids have boiling points that vary according to their pressure-temperature relationship. The apparatus of this invention may employ any of several well-known commercial refrigerants, the boiling temperature of which is directly related to the pressure maintained in the enclosure which contains them. For example, Monochlorodifluoromethane, commonly known as a refrigerant 22 or R-22 and commercially available under the trademarks FREON and GENETRON, has a boiling temperature of −41° F. at a pressure of 14.86 p.s.i.a., or slightly above one atmosphere. If this R-22 is in a closed container and maintained at an ambient temperature of, for example, 86° F., the corresponding pressure in the container is 159.8 p.s.i.g. If the liquid R-22 is retained in the container, and the gas above the liquid is allowed to escape at a rate to produce and maintain a lower pressure, the liquid R-22 will boil and additional gas will be generated until the temperature of the liquid R-22 is reduced to the boiling point of the liquid R-22 at that lower pressure.

In accordance with one aspect of the present invention, when it is desired to determine the dew point of a gas, a pressure vessel containing liquid refrigerant is placed in a sample of the gas, and the pressure within the refrigerant container is gradually reduced by permitting the gaseous refrigerant above the liquid to gradually escape. The rate at which the refrigerant gas escapes is controlled to thereby reduce the pressure in the refrigerant container at a rate to produce the desired rate of temperature reduction. When the temperature of the liquid refrigerant reaches the dew point of the sample gas, condensatIon will commence tO take place on the outer surface of the refrigerant container, which condensation will be visible to the operator. At this point the pressure converted to the corresponding temperature for the refrigerant being used of the liquid refrigerant within the container is noted, and this pressure will be an accurate indicatIon of the dew point of the sample gas.

Other objects and advantages of the invention will become apparent from the following detailed description, taken with the drawings, in which.

Figure 1:
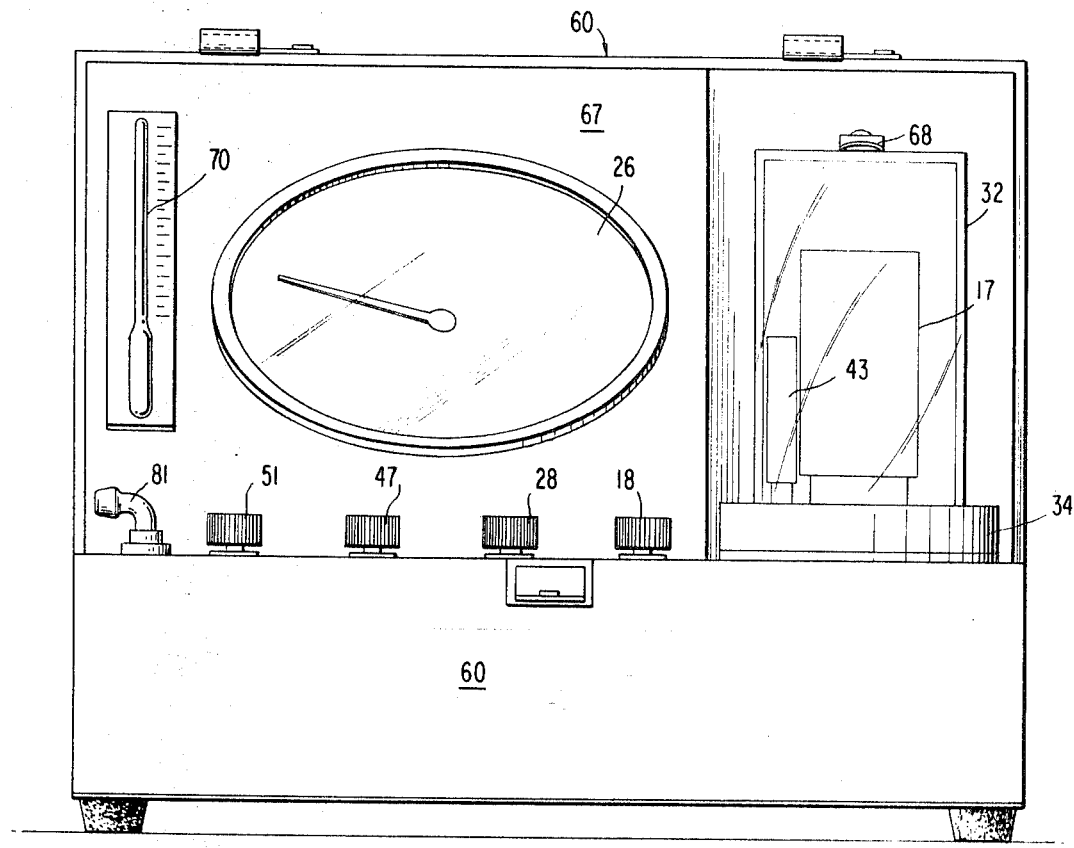
FIG. 1 is a front elevatIon view of a dew point detecting apparatus according to the present invention.

Referring first to the embodiment of the invention illustrated in FIGS. 1—5, pressure vessel 10, containing a supply of a suitable liquid refrigerant 11, is connected by coupling 12 to one end of conduit 13, and a valve 14 controls the flow of liquid refrigerant 11 from the container into the conduit 13. The conduit 13 has its other end connected in an opening 15 in the bottom end wall 16 of an upright evaporator cylinder 17, and a needle valve 18 is provided in conduit 13 to control the flow of liquid refrigerant 11 into the cylinder 17. While the cylindrical wall 19 of evaporator cylinder 17 is illustrated in the drawing as being of substantial thickness, in actual practice this cylindrical wall is formed of a relatively thin, high strength steel material and has its outer surface 20 highly polished, and preferably mirrored.

A second conduit 22 extends through opening 15 concentrically within the end portion 23 of conduit 13, and terminates in an open end 24 positioned adjacent the upper end wall 25 of evaporatOr cylinder 17. A pressure gauge 26 is directly connected to conduit 22 to continuously indicate the pressure within the evaporatOr cylinder 17. An exhaust conduit 27 is connected to conduit 22, and a needle valve 28 is connected in conduit 27 to permit gas within evaporator cylinder 17 to be exhausted at a controlled rate. Conduit 27 terminates in an open end 29 positioned slightly down stream from the throat section 30 of a venturi tube assembly 31 as is more fully explained herein below.

A transparent cylindrical sample chamber 32 is positioned over evaporator cylinder 17, with the walls of the chamber 32 being in spaced relation to the outer surface of the evaporator cylinder. Sample chamber 32 has an enlarged, outwardly extending hollow base section 34, and a plurality of openings 35 are formed in the base section in position to direct air or other sample gas flowing out of the sample chamber upwardly along the outer surface of the sample chamber.

Figure 4:
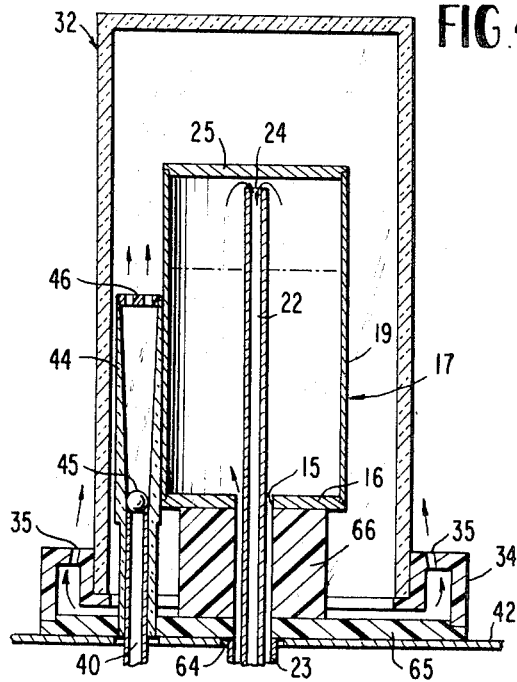
FIG. 4 is a sectional view taken on line 4–4 of FIG. 2.
Figure 5:
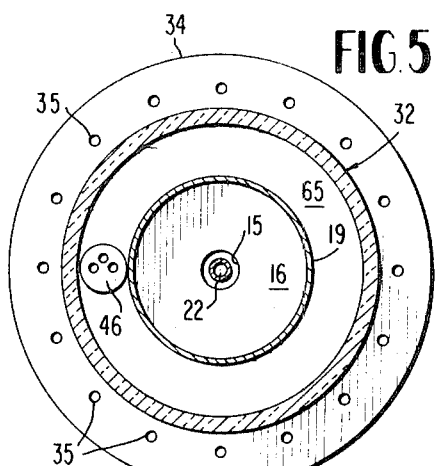
FIG. 5 is a sectional view taken on line 5–5 of FIG. 4.

An air sample conduit 39 has an end segment 40 extending through base 42 and terminating in an open end 41 positioned within the space between the walls of evaporator cylinder 17 and sample chamber 32. A sample flow meter 43 is mounted on the end segment 40 to provide a visual indication of the rate of flow of sample air into the device. Flow meter 43 comprises an elongated, vertically extending transparent tube 44, with the bore of tube 44 being enlarged at its upper end and tapering inwardly to a minimum diameter adjacent the open end 41 of sample air conduit segment 40. A metal sphere 45 is positioned within the frustoconical portion of the tube 44 so that air flowing through conduit 39 into the sample chamber 32 will tend to lift the sphere 45 from its seat on the open end 41. The height to which the sphere 45 is lifted within the tube 44 serves as an indication of the rate of flow of air into the sample chamber. This rate of flow may readily be calibrated and the preferred or desired rate indicated by suitable markings on the meter. As indicated in FIGS. 4 and 5, sphere 45 is retained in the tube 44 by a perforated cap 46. A manually operated needle valve 47 is provided in conduit 39 to control the rate of flow of air into the sample chamber.

To provide a negative gauge (below atmospheric) pressure within the evaporator cylinder 17, high velocity air may be directed through the venturi tube 31 and permitted to flow outwardly therefrom to produce a reduced pressure in the area of the open end 29 of conduit 27. High velocity air may be provided from any suitable source, illustrated schematically in FIG. 3 as coming from the conduit 39 through conduit 50. A valve 51 is provided in conduit 50 to control the rate of flow of the air through the venturi 31 and thereby the pressure within the evaporator chamber.

Figure 2:
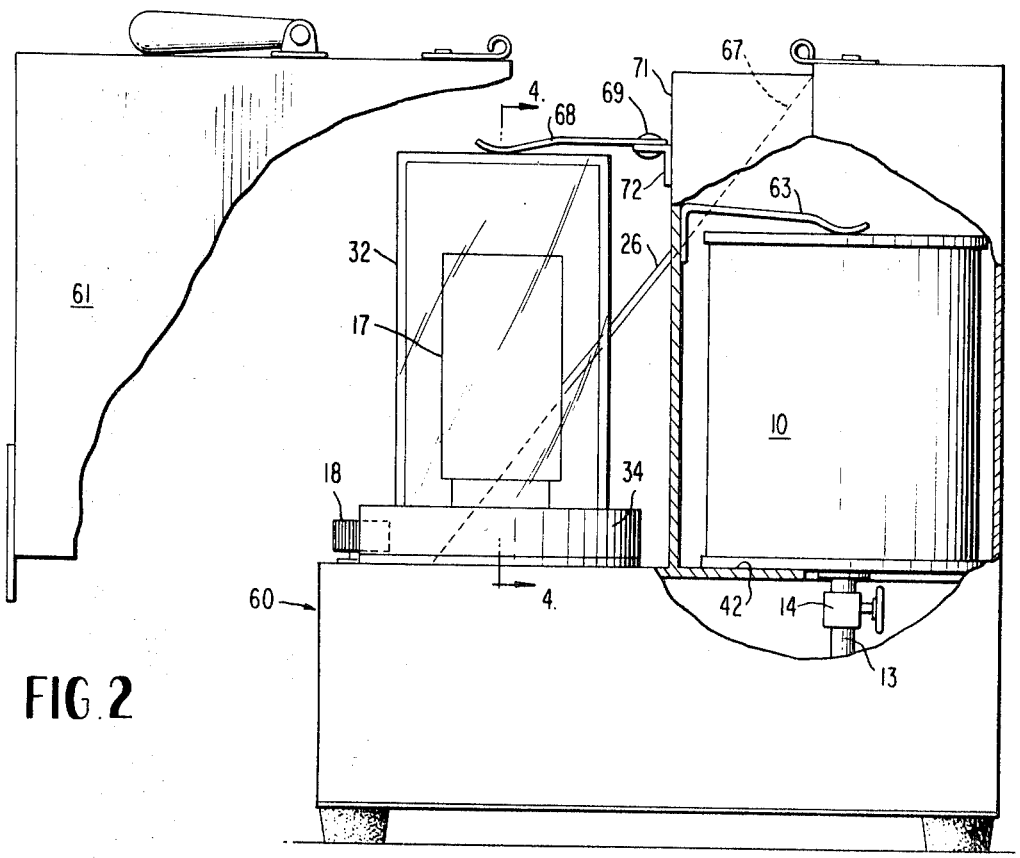
FIG. 2 is an exploded end view of the apparatus shown in FIG. 1, with parts broken away to more clearly show other parts.
Figure 3:
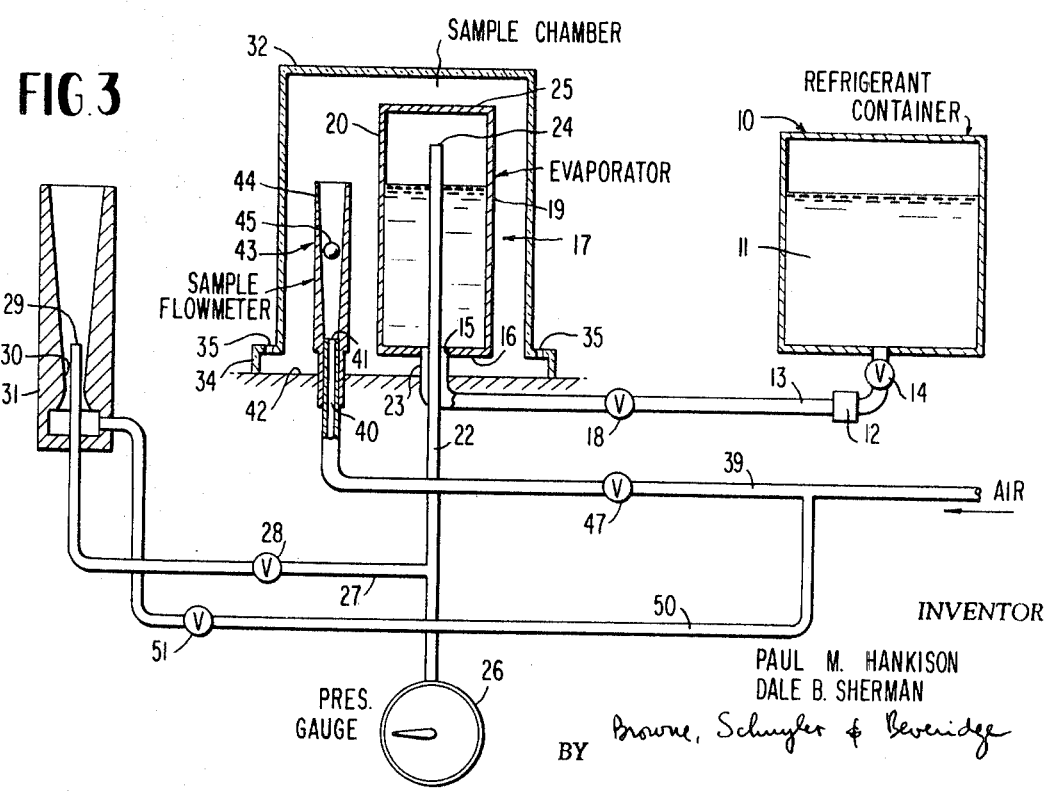
FIG. 3 is a schematic view of the apparatus shown in FIGS. 1 and 2.

As illustrated in FIGS. 1 and 2, the apparatus may be assembled in a relatively small, portable carrying case 60 having a removable front cover panel 61. The refrigerant container 10, which may be a conventional pressure cylinder of the type commercially available for use in marketing liquid refrigerant, is releasably retained on baseplate 42 by suitable means such as a spring clip illustrated at 63. Conduit 13 extends beneath baseplate 42 from refrigerant container 10, and projects upwardly through an opening 64 in baseplate 42 and is secured to an annular plate 65 mounted on the upper surface of base 42. A spacer block 66 is welded on the upper surface of plate 65, and the bottom plate 16 of evaporator cylinder 17 is welded to the upper surface of spacer block 66. An annular bore, or opening, 15 extending through plate 16, block 66, and plate 65, provides fluid communication between the interior of evaporator cylinder 17 and fluid conduit 13.

Exhaust conduit 22 extends from within the evaporator cylinder 17 outwardly through opening 15, beneath baseplate 42, and is connected to the pressure gauge 26 mounted on an inclined surface 67 of carrying case 60. Venturi 31 is mounted beneath plate 42 so that the noise from the exhaust gas and air escaping therefrom and the chances of personal contact with the liquid refrigerant will be held to a minimum. As seen in FIGS. 1 and 2, the control valves 18, 28, 47, and 51 are mounted on baseplate 42, with the manually operable stems thereof projecting above the surface of the baseplate 42 in front of the pressure gauge 26. A quick-disconnect coupling 81 is mounted on the end of sample conduit 39, with coupling 81 projecting above plate 42 for easy access to provide sample air to the device.

As illustrated in FIGS. 1 and 2, the transparent sample chamber 32 is releasably retained on the upper surface of plate 65 by a spring clip 68 pivotably supported, as by pin 69 and bracket 70 on a vertical wall 71 of the carrying case 60. Thus, to use the apparatus to determine the dew point of ambient air, it is only necessary to swing the spring clip 68 about its pivotal mounting pin 69 and lift the sample chamber 32 from around the evaporator cylinder, thereby placing the outer mirrored surface 19 of the evaporator cylinder 17 in contact with the ambient air. Under these conditions, of course, valve 47 is closed so that no air flow through flow meter 43.

Figure 6:
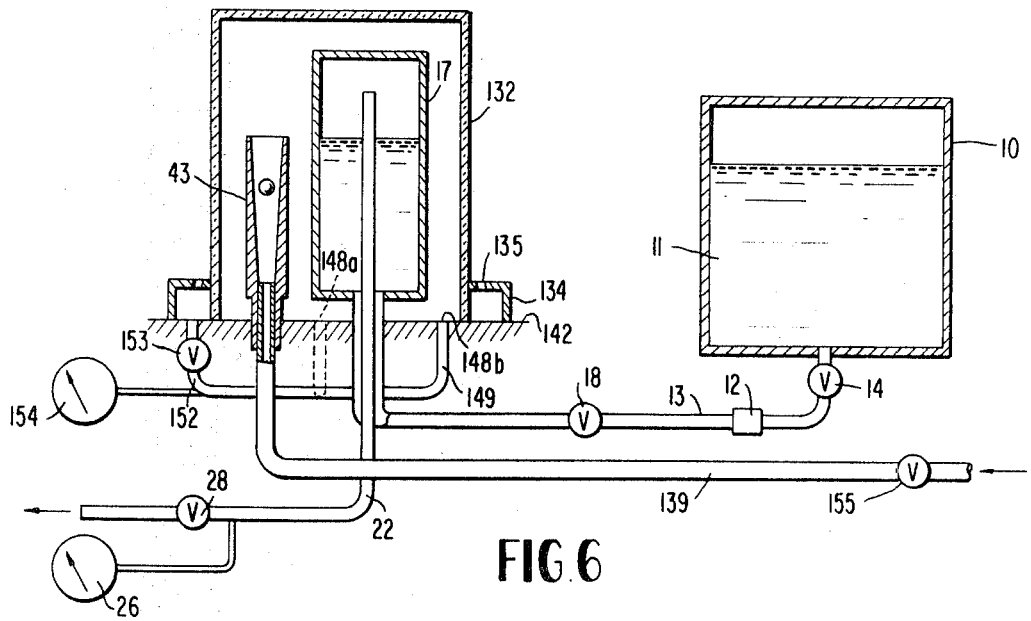
FIG. 6 is a schematic view, similar to FIG. 3, and showing an alternate embodiment of the invention.
Figure 7:
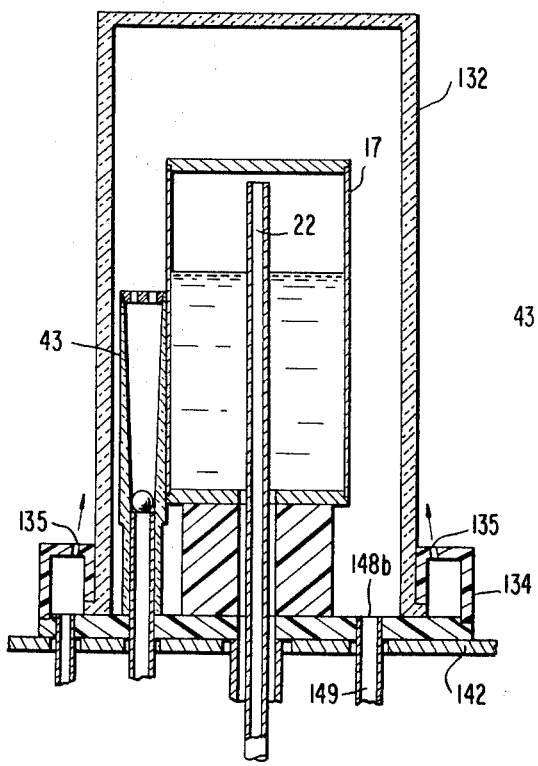
FIG. 7 is a sectional view, similar to FIG. 4, of the device shown in FIG. 6.
Figure 8:
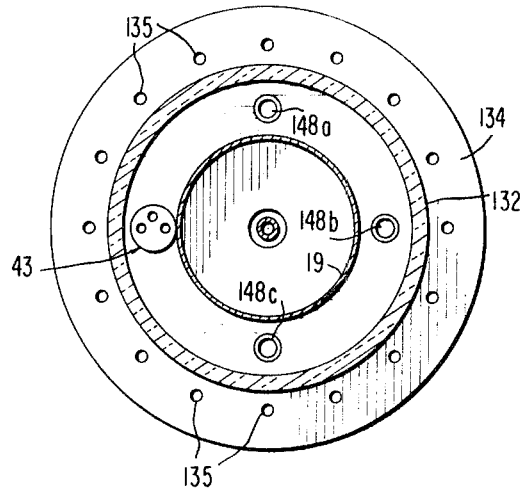
FIG. 8 is a sectional view taken on line 7–7 of FIG. 6.

Referring now to FIGS. 6—8 of the drawings, it is seen that the above-described apparatus may readily be modified to adapt it for use to determine the dew point of a sample of gas while the gas is under pressure. This is accomplished by providing a fluidtight seal between the sample chamber 132 and base 142. Sample air, under pressure, is directed into the sample chamber 132, through conduit 139 and flowmeter 43, and flows out of the sample chamber through ports 148a, 148b, and 148c into a manifold 149. A conduit 152 directs air from the manifold 149 into the hollow annular ring 134 around the base of supply chamber 132, and orifices 135 in the upper surface of annular ring 134 direct the air upwardly over the transparent outer surface of the sample chamber 132. A valve 153 in conduit 152 controls the rate of flow of sample air from the chamber 132 into the annular ring 134. A pressure gauge 154 is connected in conduit 152 between valve 153 and manifold 149 to continuously indicate the pressure of the sample air within the sample chamber 132. A suitable valve 155 may be provided in conduit 139 to stop the flow of air into chamber 132 when the device is not in use.

Figure 9:
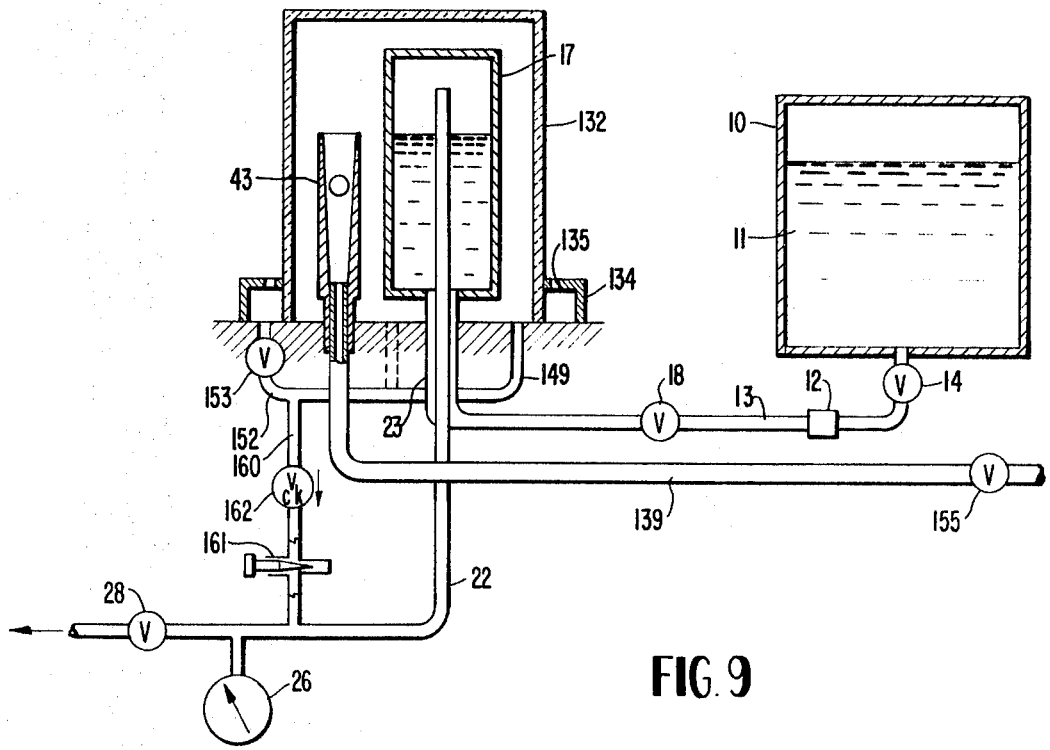
FIG. 9 is a schematic view illustrating a modificatIon of the apparatus shown in FIG. 6.

FIG. 9 illustrates a modification of the system described above with reference to FIGS. 6—8, which modification provides a means whereby the refrigerant pressure gauge 26 may be employed to determine the sample air system pressure when no sample air pressure gauge (154 in FIG. 6) is provided. To accomplish this, a crossover conduit 160 is connected between sample air exhaust conduit 152 and refrigerant gas discharge conduit 22. A needle valve 161 and a one-way check valve 162 are connected in conduit 160 to control the flow therethrough, with valve 161 being manually operable to completely close as well as to control the rate of flow through the crossover conduit. Check valve 162 is connected in conduit 160 to prevent flow of refrigerant gas therethrough when the pressure in the evaporator cylinder 17 is greater than the sample air pressure. However, with valve 161 open, check valve 162 will not interfere with the flow of sample air from conduit 152 to conduit 22 when the sample air pressure is greater than the refrigerant gas pressure.

To operate the various embodiments of the invention described above, a container 10 of commercially available liquid refrigerant R-22 is positioned within the device beneath retaining clip 63 and conduit 13 is connected to the supply cylinder and valve 14 is completely opened. Valve 18 is then slowly opened sufficiently to permit liquid refrigerant to flow through conduit 13 into the evaporator cylinder 17. Simultaneously, exhaust valve 28 is opened slightly to reduce back pressure and facilitate filling of the evaporator cylinder. When the level of liquid refrigerant in cylinder 17 reaches the open end 24 of exhaust conduit 22, the escape of the liquid refrigerant can be heard and valves 18 and 28 are then manually closed.

Assuming first that the device illustrated in FIGS. 1—5 is to be employed to determine the dew point of air in a closed or pressurized system as, for example, in a forced air cooling system, a sample of the air is admitted into the sample chamber 32 by opening valve 47 until the spherical ball 45 is raised to the desired height to indicate the proper rate of flow. At this point, it should be noted that air entering the sample chamber is directed upward toward the top of the sample chamber, then flows downward at a relatively low velocity over the outer surface of evaporator cylinder 17 into the base 34 to finally escape at a relatively high velocity through the orifices 35, with the escaping sample air being directed upwardly over the outer surface of the sample chamber to prevent fogging of the external surface from humidity present in the ambient air surrounding the device. When the rate of flow of the sample air has been adjusted to the proper value, the device is ready for a dew point determination. It is noted, however, that the sample air in chamber 32 is only slightly above atmospheric or ambient pressure, and not at the pressure of the system from which it was taken since chamber 32 is vented to atmosphere through orifices 35.

By opening exhaust valve 28, gaseous refrigerant above the surface of the liquid refrigerant in evaporator cylinder 17 is permitted to escape through conduits 22 and 27, and the pressure within the evaporator cylinder is reduced. As the pressure on the liquid refrigerant drops, it will commence to boil and its temperature will be reduced in accordance with the reduction in pressure resulting from the escaping gas. This pressure reduction will be reflected directly on the gauge 26, which may be calibrated either in pressure, or in the equivalent temperature for the refrigerant used in the device, or both. As the gaseous refrigerant is exhausted, the interface between the boiling liquid refrigerant and the gaseous refrigerant above it will be at saturation temperature and will exactly follow the temperature-pressure curve for the particular refrigerant. Since the steel sidewall 19 of the evaporator cylinder 17 is very thin, its temperature will for all practical purposes, exactly follow that of the liquid within the cylinder, and its coldest temperature will be at the level of the interface between the boiling liquid and the gas refrigerant. As the air sample flows through the sample chamber 32, the sample comes into intimate contact with the outer surface 20 of the evaporator cylinder 17 and, when the temperature of the evaporator wall is reduced to the point of saturation of the air sample being fed through the sample chamber, dew will commence to form on the mirrored surface 20.

When the device is being operated, the needle valve 28 is adjusted to permit the gaseous refrigerant to escape slowly from the top of the evaporator chamber, thus gradually reducing the temperature of the refrigerant and consequently the temperature of the surface of the evaporator cylinder wall. By watching the evaporator external surface through the transparent wall of the sample chamber, the dew condensing on the evaporator becomes visually evident. As soon as the first condensation is noted on the evaporator wall, the gauge 26 is read, and this reading is an indication of the dew point of the air sample passing through the sample chamber 32.

While the dew point thus determined was for an air sample under atmospheric pressure, rather than for the air under elevated or "system" pressure, the equivalent dew point of the air sample under system pressure may readily be calculated, or determined by reference to conversion charts or curves. However, the apparatus shown in FIGS. 6—8 or FIG. 9 may be employed to determine the dew point of the gas under system pressure directly, without the necessity of reducing the pressure of the sample air to atmospheric pressure and adjusting the dew point determination thus made. This is accomplished by directing air under full system pressure through the conduit 139 into the interior of the chamber 132, and adjusting valve 153 to control the flow of sample air out of the chamber so that the pressure within the sample chamber is maintained at the desired level. Needle valve 161 is, of course, closed when a dew point determination is being made with the apparatus of FIG. 9.

By adjusting the valve 153 to permit sample air to flow into the annular ring 134 at a relatively slow rate the pressure within the sample chamber 132 is maintained, and the rate of flow downwardly through the sample chamber will be sufficiently slow to permit condensation or fogging on the surface of evaporator cylinder 17 when the temperature of the cylinder wall reaches the dew point of the gas. While the gauge 154 provides an accurate indication of the pressure within the sample chamber 132, the flow meter 43 may advantageously be employed as a guide in adjusting the valve 153 so that a rate of flow which will produce the desired pressure within the sample chamber may quickly be established. As in the embodiment shown in FIGS. 1—5, the escaping sample gas is directed upwardly at a relatively high velocity over the surface of the transparent sample chamber to prevent fogging on its outer surface from the ambient air surrounding the device.

The apparatus illustrated in FIG. 9, is, in essence, a simplification of the apparatus shown in FIGS. 6—8, in that the pressure guage employed to measure system air pressure has been eliminated, and a simple means is provided for employing the refrigerant gas pressure gauge for measuring system air pressure. In forced air systems, the operator will normally know the system pressure at least at some point in the system, and in many practical installations, this known system pressure may eliminate the necessity for the gauge 154. However, even in such installations, particularly when the dew point measuring apparatus is in a remote area, it may be desirable to measure the pressure at the apparatus to be sure that full system pressure is received, or if such full system pressure is not received, to calibrate the units as necessary. In this embodiment, sample system pressure is determined by closing valves 18, 28, and 153, and opening valve 155. Valve 161 is then opened and gauge 26 is observed for any change. If the sample system pressure is greater than the pressure in evaporator 17, the reading on gauge 26 will increase and come to rest at system pressure. However, if the refrigerant pressure is greater than the sample system pressure, the flow of refrigerant gas into the system will be prevented by the check valve 162, and gauge 26 will not change.

If there was no change in gauge 26, valve 161 is then closed and valve 28 is opened to permit sufficient refrigerant gas to escape the reduce the pressure in evaporator cylinder 17 by some predetermined amount, e.g. 20 p.s.i.g. Valve 28 is then closed and valve 161 opened while observing gauge 26. If the pressure indicated by gauge 26 increases as valve 161 is opened, the gauge will pause at system air pressure, then slowly increase as additional refrigerant gas is generated. If the indicated pressure did not increase when valve 161 was opened for the second time, it is again closed and valve 28 is again opened to further reduce the pressure in evaporator cylinder 17. This is repeated until an increase in gauge pressure is noted when valve 161 is opened and the system pressure is determined. Thus, a very accurate determination of system pressure may be made using the accurately calibrated refrigerant gauge, after which determination the apparatus may be employed in the manner described above to determine the dew point of the system air. Further, if desired, the crossover conduit and valve arrangement shown in FIG. 9 may be employed in the apparatus of FIGS. 6—8 to provide a convenient means for calibrating the gauge 154, employing the pressure gauge 26 as a standard. Gauge 26 may be maintained in accurate calibration as more fully described herein below.

Any of the above described embodiments may be employed to determine the dew point of ambient air by simply removing the transparent sample cylinder to permit the ambient air to contact the surface of the evaporator cylinder 17. Under these conditions, valves 47 or 155 would be closed to prevent the flow of air through the flow meter 43. If the invention is to be employed primarily for the taking of ambient temperatures, such as might be expected in a weather station, or the like, then, of course, the sample chamber, as well as the flow meter and its associated pipes and valving, may be eliminated.

In order to check the dew point determination, all that is necessary to be done is to shut the exhaust valve 28 and allow the pressure of the gaseous refrigerant over the liquid in evaporator cylinder 17 to increase slightly. As the pressure increases, it causes the boiling point of the liquid refrigerant in the evaporator to increase correspondingly, and the cooled refrigerant within the evaporator chamber will absorb heat from the air sample through the metal walls of the evaporator chamber 17. As the temperature of the wall of evaporator 17 increases to above the dew point of the air sample, the sample flowing through the sample chamber 32 over the evaporator wall will cause any dew or fog that has been condensed on the surface to quickly evaporate. As soon as the dew or fog is cleared from the outer wall of the evaporator chamber, the device is again ready for a dew point determination and, by simply reopening valve 28 to permit refrigerant gas to exhaust slowly, the pressure of the gas above the liquid can again be brought down until the condensation begins to take place on the outside of the evaporator wall. At this point, gauge 26 is again read.

It has been determined experimentally that, if the temperature of the refrigerant is gradually reduced by gradually reducing the pressure of the gas and permitting the refrigerant to boil, a measurable temperature gradient may be established through the liquid refrigerant from the bottom to its top surface and, to a lesser degree through the gaseous refrigerant above the liquid surface, with the coldest point being at the saturated interface between the boiling liquid and gas. In the instant device, this phenomenon is utilized to cause the dew to condense on the outer surface of the evaporator cylinder in the form of a narrow, clearly defined annular band, or ring, at the top level of the liquid refrigerant. This ring produces a readily visible contrast on the mirrored surface of the evaporator cylinder so that condensation may be visually spotted as soon as it commences to form. It has been found experimentally that dew points can be determined in this manner with an error of less than 1° F.

If the dew point to be determined is lower than the temperature of the particular liquid refrigerant used when the pressure of the gas above the liquid is equal to ambient or atmospheric pressure, the apparatus may be employed only by further reducing the pressure of the gas or by utilizing a different refrigerant. The illustrated device employs a very simple and economical means for reducing the pressure within the evaporator cylinder 17 to permit lower dew points to be obtained for a particular liquid refrigerant. For example, R-22 has a boiling point of −41° F. at an absolute pressure of 14.86 p.s.i. (slightly above one atmosphere). However, the boiling point of R-22 is reduced to −80° F. at 4.805 p.s.i.a. (20.14 in Hg. Vacuum), which pressure is attainable by use of the venturi structure illustrated in FIG. 3. This greatly increases the flexibility of the device, particularly where a single apparatus is to be employed to determine dew points over a wide range of temperatures.

Since the temperature-pressure relation of the saturated interface between the boiling liquid and gaseous refrigerant is a straight line relation, the gauge 26 may be calibrated to read the dew point temperature directly for any particular liquid refrigerant used. Preferably, however, the gauge will be calibrated both in pressure and temperature so that the calibration of the gauge may be readily checked. To check the calibration of the gauge, a standard mercury or other suitable thermometer 70 is mounted on the slanting surface 67 adjacent the gauge 26. When the device has been left undisturbed for a period sufficiently long for the liquid refrigerant in evaporator cylinder 17 to stabilize at the temperature of the surrounding atmosphere, the temperature indicated by the gauge 26 should correspond exactly with the temperature recorded by the thermometer 70. Any deviation between these two readings would indicate that the gauge 26 is out of calibration and needs adjusting. If, however, the gauge 26 is calibrated to read pressure only, the indicated gauge pressure may quickly be converted to the equivalent temperature either by simple calculations or by reference to conversion tables published for all commercially available liquid refrigerants, and the equivalent temperature may then be compared with the temperature reading taken from the thermometer.

While we have described preferred embodiments of our invention, we wish it understood that we do not intend to be restricted solely thereto, but that we intend to include all embodiments thereof which would be apparent to one skilled in the art and which come within the spirit and scope of our invention.

We claim:

1. An apparatus for measuring and detecting the dew point of a vapor-containing gas comprising a pressure vessel for containing a volume of liquid refrigerant and having a sidewall formed of thin high strength metal, said sidewall having a smooth outer surface, inlet means in said pressure vessel including valve means for controlling the flow of liquid refrigerant under pressure into said pressure vessel, bleed means for bleeding gaseous refrigerant from said pressure vessel, said bleed means including means preventing the complete filling of said pressure vessel witH said liquid refrigerant and valve means for controlling the flow of said gaseous refrigerant from said pressure vessel, refrigerant pressure gauge means operably connected to said pressure vessel for indicatIng the pressure within said pressure vessel, a sample chamber enclosing said pressure vessel, said sample chamber having a transparent wall in spaced relation to said smooth surface, sample inlet means for directing a flow of said vapor-containing gas into said sample chamber, sample outlet means for permitting the escape of said vapor-containing gas from said sample chamber, said sample outlet means including orifice means for directing said vapor-containing gas over said transparent wall at a velocity sufficient to prevent condensation from being deposited thereon, means for controlling the rate of flow of said vapor-containing gas through said sample chamber, and flowmeter means providing a visual indicatIon of the rate of flow of said vapor-containing gas through said sample chamber.

2. The apparatus defined in claim 1 further comprising means for applying a suction to said bleed means to reduce the pressure within said pressure vessel to a level below ambient pressure.

3. The method of determining the dew point of a vapor-containing gas comprising the steps of exposing a polished metal outer surface of a metallic pressure vessel containing liquid refrigerant under pressure to the gas by enclosing the pressure vessel in a container having a transparent surface and flowing the gas through said container, establishing a temperature differential over said surface with the coldest point on said surface being at the level of the liquid-gas interface of said liquid refrigerant reducing the temperature of said surface while continuously maintaining said temperature differential by reducing the pressure of said liquid refrigerant at a controlled rate, continuing to reduce said pressure at a controlled rate until condensation commences on the coldest portion of said surface, observing when condensation commences, determining the temperature of said coldest portion of said surface by measuring the pressure within said pressure within said pressure vessel when condensation commences, and directing gas discharged from said container over said transparent surface at a relatively high velocity to prevent condensation of said transparent surface from the surrounding atmosphere so that condensation on said polished surface may be visually observed through said transparent surface.

4. An apparatus for measuring and detecting the dew point of a vapor-containing gas comprising a pressure vessel for containing a volume of liquid refrigerant and having a sidewall formed of thin high strength metal, said sidewall having a smooth outer surface, inlet means in said pressure vessel including valve means for controlling the flow of liquid refrigerant under pressure into said pressure vessel, bleed means for bleeding gaseous refrigerant from said pressure vessel, said bleed means including means preventing the complete filling of said pressure vessel with said liquid refrigerant and valve means for controlling the flow of said gaseous refrigerant from said pressure vessel, refrigerant pressure gauge means operably connected to said pressure vessel for indicatIng the pressure within said pressure vessel, a sample chamber enclosing said pressure vessel, said sample chamber having a transparent wall in spaced relation to said smooth surface, sample inlet means for directing a flow of said vapor-containing gas into said sample chamber, and sample outlet means for permitting the escape of said vapor-containing gas from said sample chamber, said sample outlet means including orifice means for directing said vapor-containing gas over said transparent wall at a velocity sufficient to prevent condensation from being deposited thereon, valve means for controlling the rate of flow of said vapor-containing gas from said sample chamber, and sample pressure gauge means for indicating the pressure of said vapor-containing gas within said sample chamber.

5. The apparatus defined in claim 4 wherein said refrigerant pressure gauge means is calibrated to simultaneously indicate the pressure within said pressure vessel and the temperature of the liquid refrigerant in said pressure vessel.

6. The apparatus defined in claim 5, further comprising thermometer means for continuously indicatIng the ambient temperature of the atmosphere surrounding the apparatus to continuously provide a temperature reference for checking the calibration of said pressure gauge means.

7. A dew point measuring and detecting device comprising an elongated generally cylindrical pressure vessel for containing a volume of liquid refrigerant and having a sidewall formed of thin high strength metal, a polished outer surface on said sidewall, means supporting said pressure vessel in an upright position, inlet means in said pressure vessel, said inlet means including valve means for controlling the flow of liquid refrigerant under pressure into said pressure vessel, bleed means for bleeding gaseous refrigerant from said pressure vessel, said bleed means including means preventing the complete filling of said pressure vessel with liquid refrigerant and valve means for controlling the rate of flow of said gaseous refrigerant from said pressure vessel, pressure gauge means operably connected to said pressure vessel for continuously indicating the pressure within said pressure vessel, evacuating means operably connected to said bleed means for reducing the pressure within said pressure vessel to less than ambient pressure, a sample chamber enclosing said pressure vessel, said sample chamber having a transparent wall through which said polished outer surface may be viewed, means for directing a flow of vapor-containing gas through said sample chamber, meter means for continuously indicating the rate of flow of said vapor-containing gas through said sample chamber, and means connecting said bleed means and said sample outlet means whereby said refrigerant pressure gauge means may be employed to calibrate said sample pressure gauge means.

8. The dew point measuring and detecting device defined in claim 7 further including means for directing a high velocity stream of gas over the outer surface of said transparent wall to reduce the tendency of condensation to form thereon.

9. A dew point measuring and detecting device comprising an elongated generally cylindrical pressure vessel for containing a volume of liquid-refrigerant and having a sidewall formed of thin high strength metal, a polished outer surface on said sidewall, means supporting said pressure vessel in an upright position, inlet means in said pressure vessel, said inlet means including valve means for controlling the flow of liquid refrigerant under pressure into said pressure vessel, bleed means for bleeding gaseous refrigerant from said pressure vessel, said bleed means including means preventing the complete filling of said pressure vessel with liquid refrigerant and valve means for controlling the rate of flow of said gaseous refrigerant from said pressure vessel, pressure gauge means operably connected to said pressure vessel for continuously indicating the pressure within said pressure vessel, evacuating means operably connected to said bleed means for reducing the pressure within said pressure vessel to less than ambient pressure, a sample chamber enclosing said pressure vessel, said sample chamber having a transparent wall through which said polished outer surface may be viewed, means for directing a flow of vapor-containing gas through said sample chamber, meter means for continuously indicating the rate of flow of said vapor-containing gas through said sample chamber, conduit means connecting said bleed means and said sample outlet means, and bypass valve means in said conduit means for controlling flow therethrough whereby said pressure gauge means may be employed to measure the pressure of said vapor-containing gas.

10. The apparatus defined in Claim 9 wherein said bypass valve means comprises a manually operable valve for closing and for controlling the rate of flow through said conduit means, and a check valve connected in said conduit to prevent flow of refrigerant from said bleed means to said sample outlet means.